June 11, 1929.　　　A. C. WHITE　　　1,716,403

BAG

Filed Jan. 23, 1926

INVENTOR.
Arthur C. White
BY
Fay, Oberlin & Fay
ATTORNEYS.

June 11, 1929.  E. A. WHITE  1,716,404
MOTION STORAGE APPARATUS FOR FRUIT
Filed March 6, 1926  2 Sheets-Sheet 2
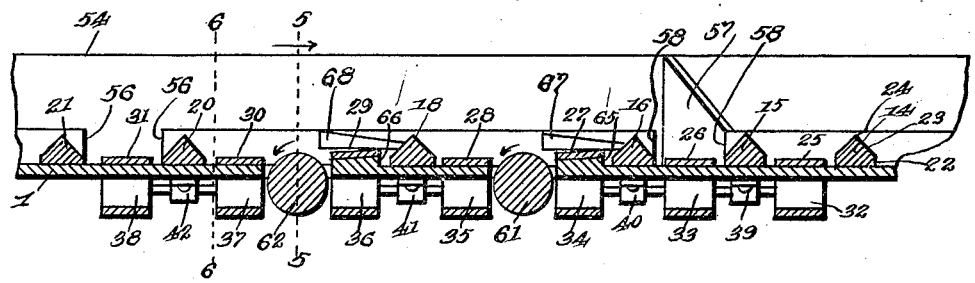
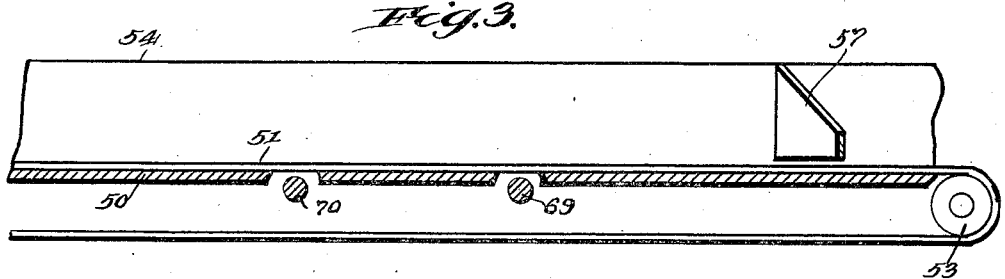
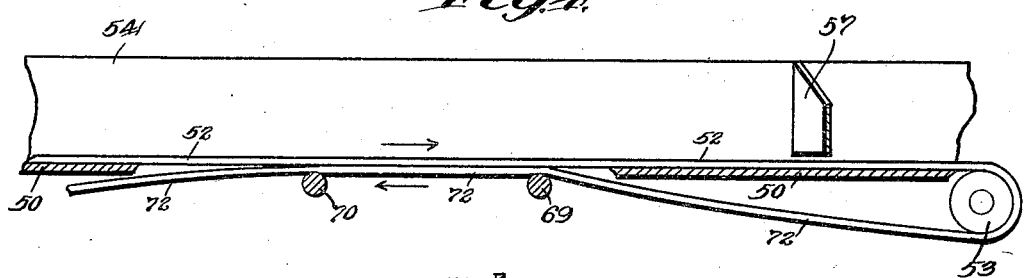
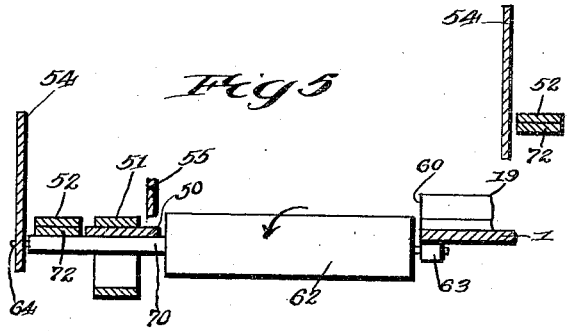
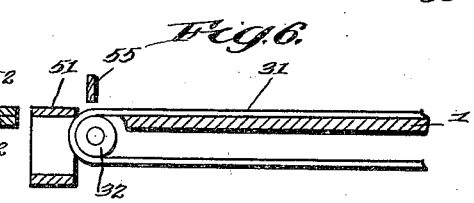
INVENTOR
Edward A. White
BY
Carl H. Crawford
ATTORNEY Patented June 11, 1929.

1,716,404

UNITED STATES PATENT OFFICE.

EDWARD A. WHITE, OF LEWISTON, IDAHO.

MOTION STORAGE APPARATUS FOR FRUIT.

Application filed March 6, 1926. Serial No. 92,930.

This invention relates to improvements in apparatus for storing fruit or analogous entities just prior to packing of the same.

My invention involves what I will term a motion storage table onto which the fruit from the conveyor means is discharged in a predetermined order as regards size, the conveyor means being disposed in a novel manner with respect to the table so that opposite sides of the latter will be accessible simultaneously or otherwise, to packers.

It is a special feature of my improved table to provide means for storage of a given sized fruit in quantities in excess of the packers' ability to work up, and to maintain such excess in motion toward opposite sides of the table, the latter having a series of excess storage quantities of fruit in a series of storage areas whereby packers may be variably shifted from one storage area to another.

It is a feature of my invention, throughout the storage table, to maintain the fruit in single file order and in separated relation, as far as possible. thereby avoiding damage to the fruit from mutual rubbing or jamming contact.

My invention has many other features and objects which will be more fully described in connection with the accompanying drawings and which will be more particularly pointed out in and by the appended claims.

In the drawings:—

Fig. 4, is an enlarged sectional view on line 4—4 of Fig. 1.

Fig. 5, is a sectional view on line 5—5 of Fig. 2.

Fig. 6, is a sectional view on line 6—6 of Fig. 2.

Like characters of reference designate similar parts throughout the different figures of the drawings.

Figure 1:
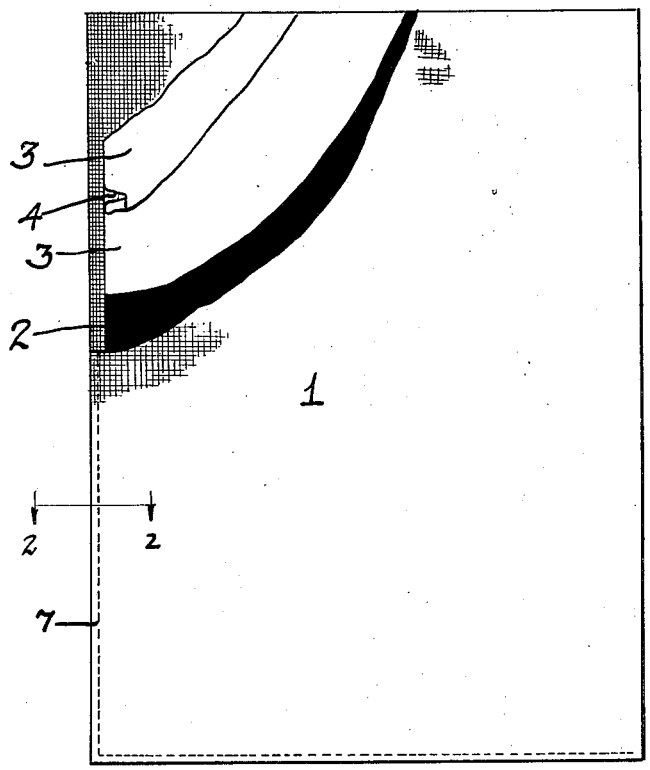
Fig. 1, is a plan view of my improved sizing and motion storage apparatus.

I will first describe my improved motion storage table which may be in the form of a flat table body 1, having end portions 2 and 3, and side portions 4 and 5. For convenience in describing the apparatus, and later in the claims, I will refer to side 4, as the "delivery side" and to side 5, as the "return side". As it is a feature and an object of the invention to segregate fruit of a given size, in a given area, and maintain this segregation, I therefore provide a storage table with what I will term a series of belt bins, one bin for each size fruit. While I have designed this apparatus primarily for handling apples, it is equally adapted for other kinds of fruit, and hence when I hereinafter use the term "apple" it is for convenience of definition and it will be understood that my invention is not limited to the handling of apples. In this embodiment, I have broadly identified the separate bins by letters A, B, C and D, as illustrated in Fig. 1, prior to the specific description of the same. Thus, these bins A to D extend transversely of the length of the table, as will now be clear.

I have shown a sizing conveyor 6, and a like conveyor 7, which extend substantially centrally of the table and in superposed relation thereto from one end thereof to the other, these conveyors each having a discharge device for each bin. In other words, conveyor 6, has a discharge device 8, for bin A, and a like device 9, for bin B. Conveyor 7, has a discharge device 10, for bin C, and a like device 11, for bin D. Thus it will be seen that there may be as many bins as necessary, with a complementary equipment of sizing conveyor means, the example shown being clearly illustrative.

I have shown a packer's conveyor 12, delivering to conveyor 6, and a packer's conveyor 13, delivering to conveyor 7.

As all of the bins and their appurtenances are identical in structure and function, this description will be confined to one bin, namely, bin B.

Figure 2:
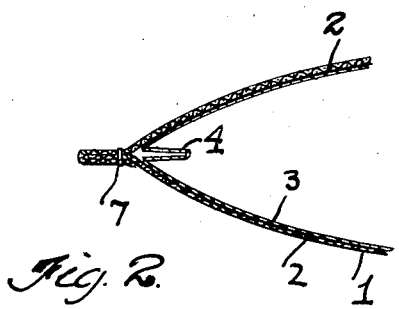
Fig. 2, is an enlarged sectional view on line 2—2 of Fig. 1.

The table 1, or bin B, is provided with a plurality of dividing strips 14 to 21, inclusive, the cross section of which is clearly shown in Fig. 2. The sides, as illustrated in strip 14, are indicated at 22, and from the sides 22 upwardly, the strip converges at 23 to a linear apex 24. These strips are close enough to each other to prevent the fruit from rolling or otherwise getting off laterally from the storage belts on which they are being advanced, as will presently appear. What I will term motion storage belts, are indicated at 25 to 31, and one each is disposed between a pair of dividing strips, as clearly shown, with a free working clearance. These belts ride, as regards their upper laps, flat upon the table 1, and they extend transversely across the table 1 from one side to the other. Near the ends of the belts, I provide pulleys 32 to 38, only the pulleys at one end being shown, and said pulleys being mounted on shafts journalled in suitable bearings 39 to 42. These storage belts are driven by any suitable means (not shown) at a uniform and preferably a slow speed. Belts 25 and 26, are driven in the direction indicated in Fig. 1, with the upper laps moving toward the delivery side 4, of table 1. Belt 27, moves toward the return side 5, of table 1, and the remainder of the belts of the bin move in opposite directions as regards adjacent belts; and as indicated by the arrows. To facilitate a later description, I will refer to belt 25, as a combined receiving and motion storage belt because this belt initially receives the fruit from the sizing conveyor. Belt 26, will be referred to as a combined return and storage belt, and belt 31, as a return storage belt, and all of the intermediate belts as storage belts as they simply perform a motion storage function and no other function.

I will next refer to what I will term a "delivery detour device" which is disposed in coacting relation with the bin belts.

This device is disposed on said delivery side 4, and the table 1 forms the bottom wall of said device, or may do so, and this device extends the length of the table for service to all the bins. A belt 43, or rather the upper lap thereof, travels in said delivery detour device in the direction indicated by the arrow, and at a relatively slow speed. The bights of the belt 43 may be trained about pulleys 44 and 45, driven in any suitable manner, with the lower lap of said belt travelling below the table 1. This detour device includes an outside wall 46, and for each bin, I provide deflectors 47, 48 and 39, which extend toward the table 1, from wall 46, as shown. These deflectors are disposed in clearance relation to belt 43, to permit the latter to pass freely under the same.

The belts 25 and 26 deliver the apples onto belt 43, and the latter advances the apples toward deflector 47, which functions to guide the apples toward and onto the intake end of belt 27, which moves toward side 5. Belt 28, moves toward side 4, and delivers apples onto belt 43, which advances the apples against deflector 48, thereby guiding the apples onto belt 29, moving toward side 5. Belt 30, moving toward side 4, delivers apples onto belt 43, and the latter advances then against deflector 49, whereby they are guided onto belt 31, which moves toward side 5.

I will next describe what I will hereinafter term a return detour device.

This device is located on side 5, of table 1, and involves a bottom wall 50, on which the upper laps 51 and 52 of two belts travel, this device extending throughout the length of the table and serving all the bins thereof. The belts 51 and 52 have their bights trained over pulleys at their ends, one end pulley being shown at 53, to which power may be applied in any suitable manner. It will be noted that belts 51 and 52, are thus driven at the same speed and that they move toward the right of Fig. 1, whereas, belt 43 moves toward the left of Fig. 1. This return detour device has an outside wall 54 and an inside wall 55. Viewing Fig. 1, I have shown the wall 55, cut away at 56, so that the extreme endmost belt 31, of bin B, can deliver apples into the return detour, and therefore, I will term belt 31, the "detour belt" to later distinguish it from belt 26, which I will term the return belt. Now as the apples enter the return detour device, they are carried by belts 51 and 52, to the right of Fig. 1, and continue so to travel until arrested by a deflector 57, which shunts the apples through an opening 58, in wall 55, onto return belt 26. Thus, the apples again enter or commence the cycle of movement which all the apples in the bin go through if not picked up by the packer. Wall 55, is continuous between openings 56 and 58.

Therefore, I will next describe the means and manner in which apples are transferred just inside the return detour device from one belt to the other, of those belts intermediate belts 26 and 31.

The dividing strips 16 and 18 are terminated at 59 and 60, respectively, and means in the form of rollers 61 and 62, are interposed therein, the ends of the roller 62 being suitably journalled at 63 and 64, as shown in Fig. 5. The rollers are of a diameter and are so disposed that they project from the table 1, in such a manner as to efficiently perform their transferring functions, as clearly shown in Fig. 2. Thus roller 61, is disposed between belts 27 and 28, to transfer apples from the former to the latter, and roller 62, is between belts 29 and 30, to transfer apples from the former to the latter. In order to facilitate this transfer function, I elevate portions of the table 1, at 65 and 66, and as shown, such elevated portions are laterally inclined toward the direction in which transfer is to be made. This elevated, and preferably though not necessarily inclined, portion or portions, are only subjacent those portions of the belts paralleling the rollers. Thus, it will be seen that the apples are not only elevated but also impelled toward the rollers. However, in practice, I prefer to employ deflectors 67 and 68, disposed substantially as shown, which function to shift the apples positively from one belt to the other, in coacting relation to the inclined elevated portions of the delivery belts 27 and 29, or rather the delivery portions thereof.

I will next describe the novel manner in which the rollers 61 and 62 are driven without requiring an independent source of application of power.

Figure 3:
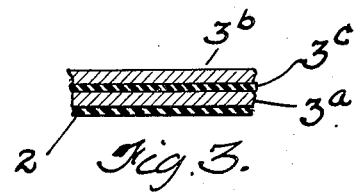
Fig. 3, is an enlarged sectional view on line 3—3 of Fig. 1.

The rollers 61 and 62 have reduced portions 69 and 70 which extend freely between the upper and lower laps of belt 51, as will be seen in Figs. 3 and 5. However, the lower lap 72, of belt 52, is trained upwardly over the roller portions 69 and 70 thereby not only affording amply sufficient friction thereon to positively drive the rollers, but also driving them in the proper direction for the performance of their function. Thus the direction of drive of the rollers is contra-clockwise, viewing Figs. 2, 3 and 4. It will thus be seen that the belt 52, performs the dual function of assisting belt 51 in advancing the apples to the right of Fig. 1, in the return detour, but it also functions to impart drive in the proper direction to the rollers.

One reason why I employ two belts, 51 and 52, in the return detour device whereas I only employ one belt 43, in the delivery detour device, is that with the novel drive arrangement for the rollers just described, I find it advantageous to keep the upper and lower laps of belt 51 in spaced relation, as shown in Fig. 6, so that belt 31, at least, can have its delivery bight so close to belt 51, that there will be no doubt about delivery of any size apple from belt 31 to belts 51 and 52, in the same single file and spaced relation that I desire to maintain. Thus, it will be seen that the pulley 32, in Fig. 6, slightly projects between the laps of belt 51. This close relation is also desirable where the belts 51 and 52 deliver to return belt 26, and in fact, at every point where the apples are delivered from one belt in angular relation to another belt. It will now be clear that if belts 51 and 52 were in one belt, I could not drive the rollers 61 and 62, and also get the delivery bights of the storage belts in the desired close relation to the detour belts, with all the pulleys 32, in alinement and driven from one source of power.

I will now describe the cycle of travel of an apple in one bin, assuming that this particular apple has not been picked up by a packer and has been allowed to traverse a complete cycle.

First, the apple will have been discharged from device 9, onto receiving belt 25, and will be advanced by the latter into the delivery detour device where belt 43 will carry the apple to the left of Fig. 1, until the apple is deflected by 47, onto belt 27. This belt 27, is one of the intermediate storage belts and moves toward side 5, of the table. When the apple reaches deflector 67, it will be transferred by roller 61, onto belt 28, and the latter will advance the apple toward side 4, of the table back into delivery detour where belt 43, will advance the apple to the left of Fig. 1. The apple will be shifted by deflector 48, onto belt 29, moving toward side 5, and deflector 68, will shift the apple onto roller 62, and the latter will transfer the apple to belt 30, which moves toward side 4. Belt 30, will deliver the apple onto belt 43, and the latter, coacting with deflector 49, will shift the apple onto belt 31, which moves toward table side 5. Belt 31 will deliver the apple onto belts 51 and 52, and the latter will advance the apple to the right of Fig. 1, until deflector 57 shunts the apple through opening 58, onto return belt 26, which moves in the same direction as the receiving belt 25, toward table side 4. Now it will be noted that belts 25 and 26 both deliver apples into the same chamber of the delivery detour device, and that deflector 47, shunts the apples from both belts onto belt 27. This is the only instance in which two apples could come into contact with each other, and because the belts move very slowly, no injury could result. It will now be clear that all the apples take the path of travel which I have described in connection with one apple, and that all the apples proceed in single file, and in spaced relation, except in the one instance noted.

Thus, I spread out the fruit, and afford not only a considerable area of storage, for taking care of a reserve amount, but I do this in such a manner that apple packers can work simultaneously from both sides of the table when necessary. All the apples in storage in a bin, are moving simultaneously toward either one side or the other of the table, and the packers can pick up apples from any one of the belts. Further, it will be noted that when apples are moving in single file and in spaced relation, and where, as in this construction, the deflectors coact with the belts to detour the apples, the latter cannot be bruised or worn as would be the case if the apples were detoured in groups, rubbing against each other. Further, by having the deflectors, join with the belts, in detouring the apples, the danger of injury is still further removed.

Many times in grading apples, the stock will run, at times, predominantly to one size, and at such times, with a large storage capacity such as this machine provides, a packer may continue packing one size, letting the apples of other and, for a time, less quantity sizes, accumulate in the other bins.

It is believed that the device of my invention will be fully understood from the foregoing description, and while I have shown a specific embodiment thereof, I do not wish to be limited thereto except for such limitations as the claims may import.

I claim:—

1. In a motion storage apparatus, a motion storage table having delivery and return sides, a plurality of belt fruit bins on said table, one bin for each size fruit, each bin comprising a series of storage belts travelling in parallel relation transversely of the length of said table and toward the delivery and return sides of said table and adjacent belts travelling in opposite directions and being sufficiently narrow to advance the fruit in single file thereon, two belts endmost of the bin being receiving and return belts and travelling in the same direction and the belt at the other extremity of the bin being a detour belt, a series of detour devices at the delivery side of said table for transferring fruit from one belt to others, a delivery detour belt travelling longitudinally of said table and coacting with said detour devices to transfer the fruit, the return side of said table having a single detour device for transferring fruit from said detour belt to said return belt, a return detour belt travelling longitudinally of said table in a direction opposite to the direction of said delivery belt and coacting with said return detour device, and transfer rollers near the return side of said table for transferring fruit from one belt to the other of those belts intermediate said detour and return belts.

2. In a motion storage apparatus, a motion storage table having delivery and return sides, a plurality of belt fruit bins on said table, one bin for each size fruit, each bin comprising a series of storage belts travelling in parallel relation and toward the delivery and return sides of said table and adjacent belts travelling in opposite directions and being sufficiently narrow to advance the fruit in single file thereon, one endmost belt of the bin being a receiving and storage belt and the other endmost belt of the bin being a detour storage belt and intermediate belts of the bin being storage belts, a series of detour devices at the delivery side of said table for transferring fruit longitudinally of the table and in one direction from one belt to others, the return side of said table having a return detour device for transferring fruit from said return storage belt back to said receiving storage belt, and devices near said return side for transferring fruit from one intermediate belt to the other.

3. In a motion storage table for fruit having adjacent storage belts travelling in opposite directions, means for deflecting the fruit from one belt toward the other, and a driven roller coacting with said means for effecting transfer of the deflected fruit from one belt to the other.

4. In a motion storage table for fruit having adjacent storage belts travelling in opposite directions, and means for tilting one belt to cause the fruit to slide off from the tilted belt onto the next adjacent belt.

5. In a motion storage table for fruit having adjacent storage belts travelling in opposite directions, means for deflecting fruit from one belt toward the other, means for elevating the discharging belt to facilitate delivery of fruit therefrom, and rolling means between said belts coacting with said first and second named means for effecting transfer of the fruit from one belt to the other.

6. A motion storage table for fruit having parallel belts of sufficient width to advance fruit or other single entities in single file and adjacent belts being driven in opposite directions, a division strip between said belts preventing fruit from rolling off from the belt on which it is being advanced and said strip being cut-away near the ends of said belts, a driven roller disposed parallel to and between the belts near the ends thereof, and means for deflecting fruit from one belt onto said roller whereby the latter will transfer the deflected fruit onto the next adjacent belt.

7. In a motion storage apparatus, a motion storage table having delivery and return sides, a plurality of belt fruit bins on said table, one bin for each size fruit, each bin comprising a series of storage belts travelling in parallel relation toward both sides of said table and being sufficiently narrow to advance the fruit in single file thereon, one endmost belt being a receiving belt and the belt next adjacent thereto being a return belt and travelling in the same direction as said receiving belt and the belt at the other extremity of the bin being a detour belt and intermediate belts being motion storage belts, means for delivering fruit one at a time onto said receiving belt, a series of detour devices at the delivery side of said table for transferring fruit from one belt to others, a detour return device at the return side of said table for transferring fruit from said detour belt to said return belt, and means disposed near said return device for transferring fruit from one intermediate belt to the other.

8. A fruit motion storage table structure comprising, a belt bin formed of a plurality of parallel belts with adjacent belts travelling in opposite directions, belt detour means at one end of said belts for transferring fruit from one belt to the other, belt detour means at the remaining ends of said belts for transferring fruit from one endmost belt to the other, and means for transferring fruit from one intermediate belt to the other.

9. In a motion storage apparatus, a motion storage table provided with a transfer belt moving in one direction, a plurality of bin belts with adjacent belts travelling in opposite directions and said belts terminating at one side edge of said transfer belt whereby all bin belts traveling toward said transfer belt will deliver fruit to said transfer belt and all bin belts traveling away from said transfer belt are adapted to receive fruit from said transfer belt, and means for singly causing the fruit entities delivered onto said transfer belt to be shunted onto a bin belt receiving from said transfer belt.

10. In a motion storage apparatus, a motion storage table provided with a belt bin including a plurality of parallel belts with adjacent belts moving in opposite directions and toward both sides of the table and one endmost belt being an egress belt, devices adjacent both sides of said table coacting with said belts to cause the fruit entities to be advanced serially on said belts and consecutively toward and finally onto said egress belt, and said belt bin including an ingress belt approximately at the opposite end of said belt bin from said ingress belt and coacting with said devices.

11. A fruit motion storage table structure comprising, a belt bin formed of a plurality of oppositely moving parallel belts, means adjacent the ends of said belts for consecutively transferring fruit entities serially from one belt to the other to thereby enable the fruit entities to make a complete circuit of said belt bin from one extremity thereof to another, and means for returning the fruit that has made one complete circuit of said belt bin to a starting position whereby the same fruit may again complete an endless circuit of said belt bin.

In testimony, that I claim the foregoing as my own, I hereby affix my signature.

EDWARD A. WHITE.